United States Patent [19]

Montenbruck et al.

[11] Patent Number: 5,506,780
[45] Date of Patent: Apr. 9, 1996

[54] APPARATUS FOR ORBIT CONTROL OF AT LEAST TWO CO-LOCATED GEOSTATIONARY SATELLITES

[75] Inventors: Oliver Montenbruck, München; Martin Eckstein, Wörthsee; Wilhelm Werner, Bieringen (Schöntal), all of Germany

[73] Assignee: Deutsche Forschungsanstalt für Luft- und Raumfahrt e.V., Köln, Germany

[21] Appl. No.: 965,868

[22] Filed: Oct. 23, 1992

[30] Foreign Application Priority Data

Oct. 23, 1991 [DE] Germany .......................... 41 35 034.0

[51] Int. Cl.$^6$ ...................................................... B64G 1/10
[52] U.S. Cl. ........................ 364/459; 364/460; 364/434; 244/158 R; 244/161; 244/164
[58] Field of Search .......................... 455/13.1; 364/459, 364/443, 460; 244/168, 158 R, 164, 176

[56] References Cited

U.S. PATENT DOCUMENTS

| | | | |
|---|---|---|---|
| 3,747,095 | 7/1973 | Wilson | 343/7.4 |
| 4,502,051 | 2/1985 | Dondl | 342/356 |
| 4,691,882 | 9/1987 | Young | 244/158 R |
| 4,759,517 | 7/1988 | Clark | 244/168 |
| 4,809,935 | 3/1989 | Draim | 244/158 R |
| 4,854,527 | 8/1989 | Draim | 244/158 R |
| 4,883,244 | 11/1989 | Challoner et al. | 364/459 |
| 4,943,808 | 7/1990 | Dulck et al. | 455/13.1 |
| 5,043,903 | 8/1991 | Constant | 364/460 |
| 5,077,561 | 12/1991 | Gorton et al. | 364/459 |
| 5,120,007 | 6/1992 | Pocha et al. | 244/158 R |
| 5,124,925 | 6/1992 | Gamble et al. | 364/459 |
| 5,132,910 | 7/1992 | Scheit et al. | 364/459 |
| 5,267,167 | 11/1993 | Glickman | 364/459 |

OTHER PUBLICATIONS

Arthur Gelb, "Applied Optimal Estimation," pp. 129–130, The M.I.T. Press, 1989.
Leonard et al., "Orbital Formationkeeping with differential Drag", J. Guidance, vol. 12, No. 1, pp. 108–113, Jan.–Feb. 1989.
Vassar et al., "Formationkeeping for a Pair of Satellites in a Circular Orbit," J. Guidance, vol. 8, No. 2, pp. 235–242, Mar.–Apr. 1985.

Primary Examiner—Kevin J. Teska
Assistant Examiner—T. Phan
Attorney, Agent, or Firm—Browdy and Neimark

[57] ABSTRACT

In an apparatus for orbit control of at least two co-located geostationary satellites a single interface is provided in the form of an orbit database for exchanging orbit and maneuver data between four independent decoupled function blocks of an orbit control system having a matched function scope, i.e. between a first function block for orbit determination and maneuver estimation/maneuver calibration, a second function block for maneuver planning, a third function block for monitoring the relative movement and a fourth function block for predicting specific events and ephemerides (FIG. 1)

21 Claims, 11 Drawing Sheets

| Selection of Database Record | Record 3 of 3 |

Created   29-FEB-99 12:07:58
Source    ES2
Epoch     91 123   430 0.000

| | | | |
|---|---|---|---|
| x | -37107.7496 km | a | 42076.6948 km |
| y | -19953.3740 km | e | 0.0034409839 |
| z | - 62.3098 km | i | 0.085709 deg |
| vx | 1.44719757 km/s | ran | 165.687646 deg |
| vy | -2.71179396 km/s | aop | 289.620752 deg |
| vz | 0.00067700 km/s | M | 112.599010 deg |
| | | lam | 0.000000 deg |

SatId      9100302
Mass       1142.0 kg
Area (CR)  32.19 m**2
CR         1.355
Area (CD)  6.60 m**2
CD         2.300

Maneuvers 3

| # | Date | | | Radial | East | North |
|---|---|---|---|---|---|---|
| 1 | 91/01/25 | 4:30: 0.000 | | 0.0000 | -0.0500 | 0.0000 |
| 2 | 91/01/27 | 1:30: 0.000 | | -1.0230 | 0.0121 | 1.0523 |
| 3 | 91/01/28 | 2:30: 0.000 | | 2.0230 | 0.0121 | 1.0523 |

Press <Select>, <PrevScreen>, <Next Screen> or <Help>

```
GENERATION TIME : 4-SEP-91 16:17    Source: Maneuver Estimation Example

Epoch          : 91 818   0 0 0.000        SatID: 8906201
Cart:  25209.5523 -33822.3429  -33.5111   2.46431291  1.83635467 -0.002237343
Kep1:  42165.5465 0.000447241   0.063476  80.886608   60.275554 165.524131
Mass:  1211.3  Area (CR):  52.00   CRO:  1.350  Area (CD):  10.00  CD:  2.300
East Long:  -19.163889    Lat:  0.000000   Height:   0.000
Maneuvers:  2
Date  1991/ 8/19  20:44:19.0  Rad -0.11201*  East  0.02731*  North  2.17487*
Date  1991/ 8/22  19:16:52.0  Rad -0.00473*  East -0.04142*  North  0.00000

GENERATION TIME : 4-SEP-91 16:17    Source: Maneuver Estimation Example

Epoch          : 91 823   0 0 0.000        SatID: 8906201
Cart:  28011.4731 -31537.2664  -18.0103   2.29813150  2.04086514 -0.00155841
Kep1:  42166.7520 0.000349422   0.037978  91.509212   53.849715 166.243119
Mass:  1211.3  Area (CR):  52.00   CRO:  1.350  Area (CD):  10.00  CD:  2.300
East Long:  -19.179671    Lat:  0.000000   Height:   0.000
Maneuvers:  0
```

FIG. 6

Tracking data summary:

from 91- 8-18 1:27
to 91- 8-21 22:56

| station | type | sigma | N | residuals | bias |
|---|---|---|---|---|---|
| 3246 | AZIMUTH | 20.0" | 183 | 0.01 +/- 12.46" | -21.12 +/- 1.66" |
| 3246 | ELEVATION | 20.0" | 183 | 0.00 +/- 7.58" | 40.28 +/- 1.49" |
| 3247 | S_RANGE | 5.0m | 165 | 0.00 +/- 4.67m | 0.00m |

Maneuver summary:

| date | UTC | radial [m/s] | east [m/s] | north [m/s] |
|---|---|---|---|---|
| 91- 8-19 | 20:44:19.0 | -0.0994 +/- 0.0024 | 0.0270 +/- 0.0001 | 2.2713 +/- 0.0191 |
| | | -0.0920 (apriori) | 0.0390 (apriori) | 2.2937 (apriori) |

Satellite:

Sat_ID    8906201
Mass      1211.30kg
Area(CR)  52.00 m**2    CRO  1.3501 +/- 0.0024 (panels normal to sun dir.)
Area (CD) 52.00 m**2    CD   2.3000

Epoch:

Date   91- 8-16
UTC    0: 0: 0.00000

State vector:

| | estimate | correction |
|---|---|---|
| x [m] | 24026843.57 +/- 118.41 | 517.76 |
| y [m] | -34672689.62 +/- 94.71 | 364.46 |
| z [m] | -29378.07 +/- 391.81 | -88.39 |
| x-dot [m/s] | 2526.180745 +/- 0.005439 | -0.026314 |
| y-dot [m/s] | 1750.228019 +/- 0.007662 | 0.039667 |
| z-dot [m/s] | -2.331967 +/- 0.028368 | -0.003613 |

Kepler elements:

| | estimate | correction |
|---|---|---|
| semimajor axis [m] | 42165162.81 +/- 2.40 | 17.21 |
| eccentricity | 0.00045368 +/- 0.00000116 | -0.00000060 |
| inclination [deg] | 0.0590088 +/- 0.0002587 | 0.0001308 |
| ra. asc. node [deg] | 82.1722541 +/- 0.6610892 | -0.0408889 |
| arg. perigee [deg] | 53.4268831 +/- 0.5274641 | -0.0046209 |
| mean anomaly [deg] | 169.1115372 +/- 0.1489022 | 0.0464242 |

Convergence:

position 0.01 m velocity 0.00000 m/s

FIG. 7

Tracking data summary:

from    91- 8-21    1:32
to       91- 8-24    22:38

| station | type | sigma | N | residuals | bias |
|---------|------|-------|---|-----------|------|
| 3246 | AZIMUTH | 20.0" | 214 | 0.01 +/- 12.92" | -17.96 +/- 1.54" |
| 3246 | ELEVATION | 20.0" | 214 | 0.00 +/- 8.57" | 40.25 +/- 1.37" |
| 3247 | S_RANGE | 5.0m | 165 | 0.00 +/- 5.72m | 0.00m |

Maneuver summary:

| date | UTC | radial [m/s] | east [m/s] | north [m/s] |
|------|-----|--------------|------------|-------------|
| 91- 8-22 | 19:16:52.3 | -0.0049 +/- 0.0001 | -0.0412 +/- 0.0000 | 0.0000 |
|  |  | -0.0000 (apriori) | -0.0401 (apriori) |  |
| 91- 9- 2 | 19:47:43.8 | -0.0900 | 0.0382 |  |

Satellite:

Sat_ID    8906201
Mass      1209.30kg
Area(CR)   52.00 m**2    CRO   1.3249 +/- 0.0020   (panels normal to sun dir.)
Area (CD)   52.00 m**2    CD    2.3000

Epoch:

Date    91- 8-21
UTC     0: 0: 0.00000

State vector:

|  | estimate | correction |
|---|----------|------------|
| x [m] | 26919670.08 +/- 87.62 | 89.27 |
| y [m] | -32475653.33 +/- 76.71 | 89.75 |
| z [m] | -16263.74 +/- 353.13 | -58.19 |
| x-dot [m/s] | 2366.450231 +/- 0.004287 | -0.007015 |
| y-dot [m/s] | 1961.140837 +/- 0.004691 | 0.010277 |
| z-dot [m/s] | -1.262214 +/- 0.025565 | -0.023186 |

Kepler elements:

|  | estimate | correction |
|---|----------|------------|
| semimajor axis [m] | 42167305.08 +/- 2.16 | 7.78 |
| eccentricity | 0.00037083 +/- 0.00000104 | -0.00000077 |
| inclination [deg] | 0.0322733 +/- 0.0002350 | 0.0003683 |
| ra. asc. node [deg] | 86.4600611 +/- 1.0167268 | -0.4280241 |
| arg. perigee [deg] | 61.0563040 +/- 0.8631081 | -0.5581380 |
| mean anomaly [deg] | 162.1265673 +/- 0.1644082 | 0.1304043 |

Convergence:

position   0.01 m velocity   0.00000 m/s

APPARATUS FOR ORBIT CONTROL OF AT LEAST TWO CO-LOCATED GEOSTATIONARY SATELLITES

BACKGROUND OF THE INVENTION

1. Field of the Invention

The invention relates to an apparatus for orbit control of at least two co-located geostationary satellites.

2. Description of the Prior Art

Due to the great variety of disturbing forces from the earth, sun and moon, a position maintenance of geostationary satellites, generally referred to as station keeping, requires a constant orbit control to keep a satellite in the tolerance window allocated to it. Tolerance window means a region which is defined in longitude and latitude around the nominal position above the equator with a magnitude of usually ±0.05° to ±0.1° in longitude and latitude. In the present case the term orbit control means a control and monitoring of the translational satellite movement.

An orbit control is made more difficult by the increasing practice of operating several satellites in a common tolerance window. Thus, for example, at present Astra 1A and 1B are operated on 19.2° east and there are plans to increase this by Astra 1C and 1D in the years 1993 and 1994. This practice is referred to as co-positioning, that is in English co-location. For directly transmitting satellites the WARC (World Administrative Radio Conference) allocated locations and frequencies in 1977 and made free use of co-location. For example, the position 19° west (±0.1° in longitude and latitude) was allocated to the space stations (satellites) of twelve countries, seven European and five African.

For an orbit control for station keeping, essentially an orbit determination, maneuver planning and a maneuver calibration are to be carried out. These operations must be repeated in a correction cycle from seven to fourteen days over the entire life of a satellite, usually seven to ten years.

In an orbit determination, generally the parameters or orbit elements of a predetermined orbit model describing the satellite motion mathematically are to be determined in such a manner that the angle and range measurements made by one or more ground stations and referred to as tracking data are represented as accurately as possible by the model. Once the orbit elements are known at a reference point of time, referred to as epoch, it is possible to reconstruct or predict therefrom the location coordinates and velocity components, i.e. the state vector, for each desired time section as a function of the time.

Orbit maneuvers mean velocity changes of the satellites which are achieved by activating and deactivating selected satellite-carried thrust jets. Jet arrays generally permit thrust in the north/south and in the east/west direction. The orbit elements then also change in caculable manner. On the basis of the orbit prediction correction maneuvers may be planned in such a manner that certain desired orbit elements are achieved and thus infringements of the tolerance window or close encounters with other satellites are avoided.

By means of a maneuver calibration, from the tracking data of a time interval not only the orbit elements but in addition also thrust components of the maneuvers carried out in this interval are determined and compared with desired values. A maneuver calibration makes it possible to take the deviations found into account during future maneuver planning and thus enable the accuracy to be improved.

The methods used at present for orbit control have in particular the following disadvantages:

1. An orbit control for station keeping is carried out at present in many operational steps which as a rule are effected consecutively by calling up individual computer programs each having a relatively restricted function scope.

2. In the orbit determining process maneuvers necessary for orbit keeping are not taken into account or only inadequately taken into account. For the calibration of the maneuver it is therefore necessary to carry out independent orbit determinations before and after the maneuver and this requires a tracking period of about 2 days before and after the maneuver. As a result, a quick reaction to execution errors or other disturbances is not possible, as would be the more important the higher the number of satellites located in a common window. This also has a detrimental effect on the calibration accuracy and the operational expenditure is made more difficult and increased by the necessity of performing several different program runs and the correspondingly increased administration of the results.

3. The planning of station keeping maneuvers, that is position maintaining maneuvers, is designed for the operation of individual satellites and serves essentially to avoid window infringements. No account is taken of strategies for avoiding close encounters in the event of several satellites in a common window.

4. Known systematic maneuver execution errors cannot be taken into account in the maneuver planning. This results in an uncertainty in the prediction of the satellite location and in the case of co-located satellites makes it necessary to increase the safety distances apart. This in turn means that maneuvers for avoiding dropping below these safety distances have to be carried out more frequently. Poorly calibrated maneuvers have the same effect.

5. Orbit data for a maneuver planning, a station prediction regarding the time variation of the directional angle of the ground antenna to the satellite, a prediction of shadow passage times and time regions in which disturbing effects due to the sun and moon on the infrared earth sensors are possible, etc., are administered in the form of ephemerides. These are lists containing the position and velocity of the satellite in discrete time steps. Due to their extent, such ephemerides require a great deal of memory space and are complicated to handle. A rapid assessment of the physical information content of such ephemerides lists with regard to orbit disturbances, maneuvers, etc., is rather impaired than facilitated by the high redundancy. This applies in particular in unexpected and time-critical situations.

6. An exchange and comparison of orbit data between different control centres is not provided as an integral part of the orbit control process, because the methods used hitherto were developed only for individual satellites. On the other hand the operation of several satellites in a common window by different control centres requires specific interfaces for passing on and receiving orbit information in a data which is tolerant with regard to systematic simulation errors of different orbit control systems.

SUMMARY OF THE INVENTION

The invention is thus based on the problem of creating an apparatus for the orbit control of at least two co-positioned geostationary satellites with which a quick and reliable reaction is possible to execution errors and disturbances, close encounters of different satellites largely eliminated and an exchange and comparison of orbit information between different control centres easy to carry out.

The invention therefore proposes in an apparatus for orbit control of at least two co-located geostationary satellites the improvement in which four independent decoupled function blocks (a, b, c, d) of an orbit control system with a matched function scope are consecutively executed by the operator in the order a, b, c, d via an orbit database which serves as an interface between the function blocks and to which data is transferred in a defined format, obtain hereby the required input data from the orbit database and if necessary supply the results generated to the orbit database again, a) a first function block for orbit determination from the measurements of ground stations determines all parameters which are necessary for calculation of the ephemerides in the form of lists containing position, velocity and other important orbit-relevant quantities in discrete time steps, as functions of the time for a desired time period, and calibration data of executed orbit maneuvers for the co-located satellites and stores them in the orbit database;

b) the second function block for maneuver planning accesses the results stored in the orbit database and calculates therefrom parameters for orbit maneuvers so that a satellite at predetermined dates reaches a fixed desired orbit, the results once again also being stored in the orbit database;

c) with the aid of the orbit and maneuver parameters stored in the orbit database the third function block for monitoring the relative movement calculates the relative distances and velocities, resolved by components, between all co-located satellites for a desired period of time and d) the fourth function block for predicting specific events and ephemerides employs the results of the other function blocks stored in the orbit database for predicting events such as the passage of a satellite through the earth or moon shadow, a disturbance of an infrared sensor by entrance of the sun or moon into the field of view thereof, a position of the sun near the line of sight of the ground station to the satellite, etc., and to compute a detailed orbit ephemeris.

The essential feature of the apparatus according to the invention for orbit control of two or more co-located geostationary satellites resides in the modular division of the orbit control into four independent function blocks which are referred to hereinafter also as core modules, that is in function blocks for a) orbit determination and maneuver estimation or maneuver calibration;

b) maneuver planning, c) monitoring of the relative movement and d) prediction of specific events.

The modular division of the orbit control into four independent function blocks is amplified by their connection for exchange of orbit data via a specifically designed orbit database. Furthermore, the function scope of the core modules and the nature of their result representation is specifically configured for the needs of the orbit control of co-located satellites.

Although the apparatus according to the invention is configured for the operation of any desired number of co-located satelites, at present the maximum number is limited to about ten satellites by the present-day state orbit surveying and maneuver execution accuracy and by lack of automation of control sequences. Since furthermore with the apparatus according to the invention only a few user interfaces are necessary, the operational expenditure is thereby reduced and at the same time reliability increased. Moreover, all results essential to an assessment are always automatically generated. Furthermore, the accuracy of an orbit prediction can be quite considerably increased by an integrated orbit and maneuver estimation, an improved maneuver calculation and by taking account of systematic coupling effects of the maneuvers.

According to an advantageous further development the orbit database comprises a scratch database for storing all current orbit database sets and a best-knowledge database for entering only the best known orbit and maneuver data. To assist the management for the database, additional screen masks and automatic processes may be provided; all the obsolete data records are automatically removed from the best-knowledge database and the data records automatically chronologically sorted.

Furthermore, with the apparatus according to the invention the path can be completely reconstructed, including all the past maneuvers, from the best-knowledge data bank for subsequent analyses and for general documentation purposes. By the use of the "best-knowledge database" an orbit prediction can be made, including all known maneuvers in a predetermined time region. In addition, all the quantitative orbit determination results are summarized on a socalled "summary sheet" both for a manual and for an automatic evaluation. In addition, an automatically scaled socalled residue plot with a designation of the maneuver times is made available for the assessment of the quality of the orbit determination by the user.

Also, the orbit profile may be represented in the form of a socalled station keeping plot on a single page. Furthermore, with the apparatus according to the invention it is possible to plan several correction cycles in advance and in this manner advantageously utilize the coupling effects, undesirable in themselves; the user can then assess the planning success by the conventional representation in the station keeping plot.

According to a further advantageous embodiment of the invention, for each co-located or temporarily adjacent satellite an own best-knowledge orbit database is created.

Furthermore, a user interface can be provided for a socalled input of external orbit data and for a socalled export thereof in a matched format. In addition, the apparatus according to the invention can be amplified by a means for determining the relative geometry of the orbit movement of co-located or temporarily adjacent satellites. To monitor the maintenance of a separation strategy by the individual satellites, in the apparatus according to the invention an integrated plot of socalled eccentricity, (e) and inclination, (i) vectors of all participating satellites is provided.

Also, with the apparatus according to the invention tile possible future occurrence of close encounters may be checked in pairs for all the participating satellites and if the tolerances drop below tolerance limits, for example the minimum distance apart, additional plots are automatically generated for the data analysis.

The calculation of collision evasion maneuvers can also be carried out by an additionally provided maneuver planning module. Furthermore, with the apparatus according to the invention the orbits of all the participating satellites and their relative geometry can be automatically generated in the entire time interval covered in the databases from the best-knowledge databases for any desired time sections, for example for analysis purposes.

The structure created with the aid of the apparatus according to the invention thus provides the basis and prerequisite for carrying out completely automatically an orbit determination including result valuation, result verification, and decision making by an expert system without the need for corresponding human intervention. To obviate human interaction with the system, specially-designed menu masks for the user interface are employed making use of forms generation and database interface software.

The invention can be employed advantageously also for orbit control of individual satellites. It provides the user with the possibility of a coherent transition of the orbit control from one satellite to several co-located satellites.

BRIEF DESCRIPTION OF THE DRAWINGS

Hereinafter the invention will be explained in detail with reference to preferred embodiments with the aid of the attached drawings, wherein.

DESCRIPTION OF THE PREFERRED EMBODIMENTS

Figure 1:
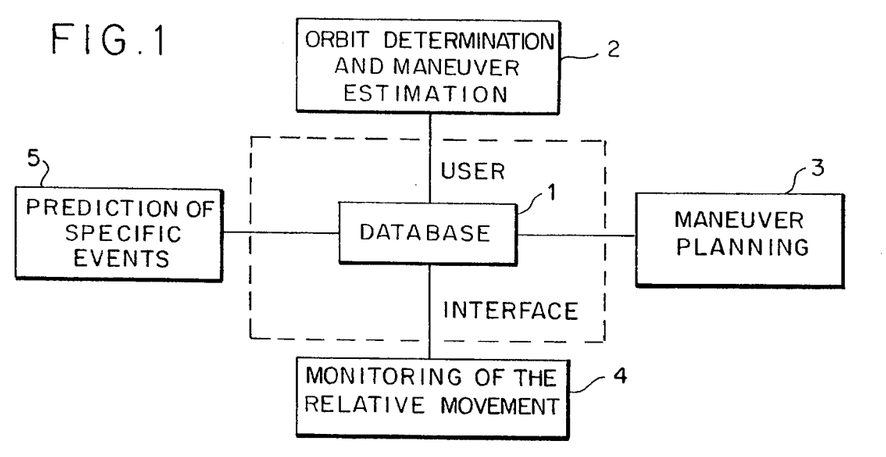
FIG. 1 shows a block diagram of the basic structure of the apparatus according to the invention for orbit control of co-located geostationary satellites.

In FIG. 1, in the form of a block diagram a database 1 is illustrated schematically and allocated to said database are four independent function blocks, that is a function block 2 for plot determination and maneuver estimation or maneuver calibration, a function block 3 for maneuver planning, a function block 4 for monitoring the relative movement and a function block 5 for predicting special events.

Orbit and maneuver data as a result of orbit determinations and maneuver planning are stored in compact and clear manner by the database 1; at the same time the database represents at any time the actual knowledge status of the orbit profile. These data are then sufficient to regenerate the continuous orbit profile. Furthermore, each of the four function blocks 2 to 5 can be provided with orbit information from the database 1 as required for the particular task. By means of special software modules it is then possible with a minimum input expenditure from the user interface for the user to transmit data to the function blocks 2 to 5, which are also referred to as core modules, and thereby start said blocks. By making use of satellite, orbit, and maneuver data stored in the database, relevant input data can automatically be retrieved by the individual data is thus avoided. This also make it possible to link user specific modules via the database interface without thereby impairing the function of the core modules or having to modify said function.

Figure 4:
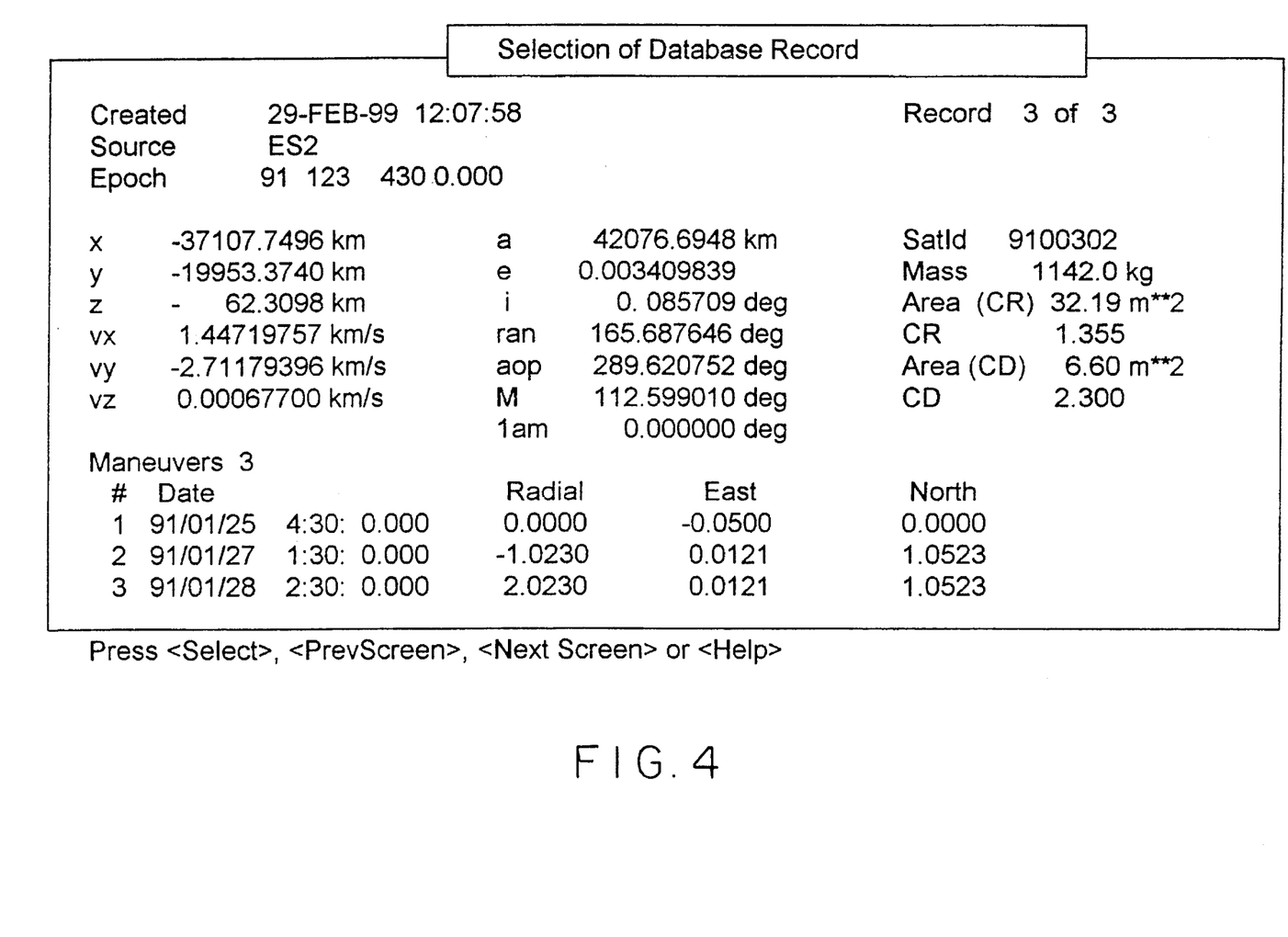
FIG. 4 shows an example of part of an orbit database exhibiting the appearance of a data record in a specific screen mask.
Figure 5:
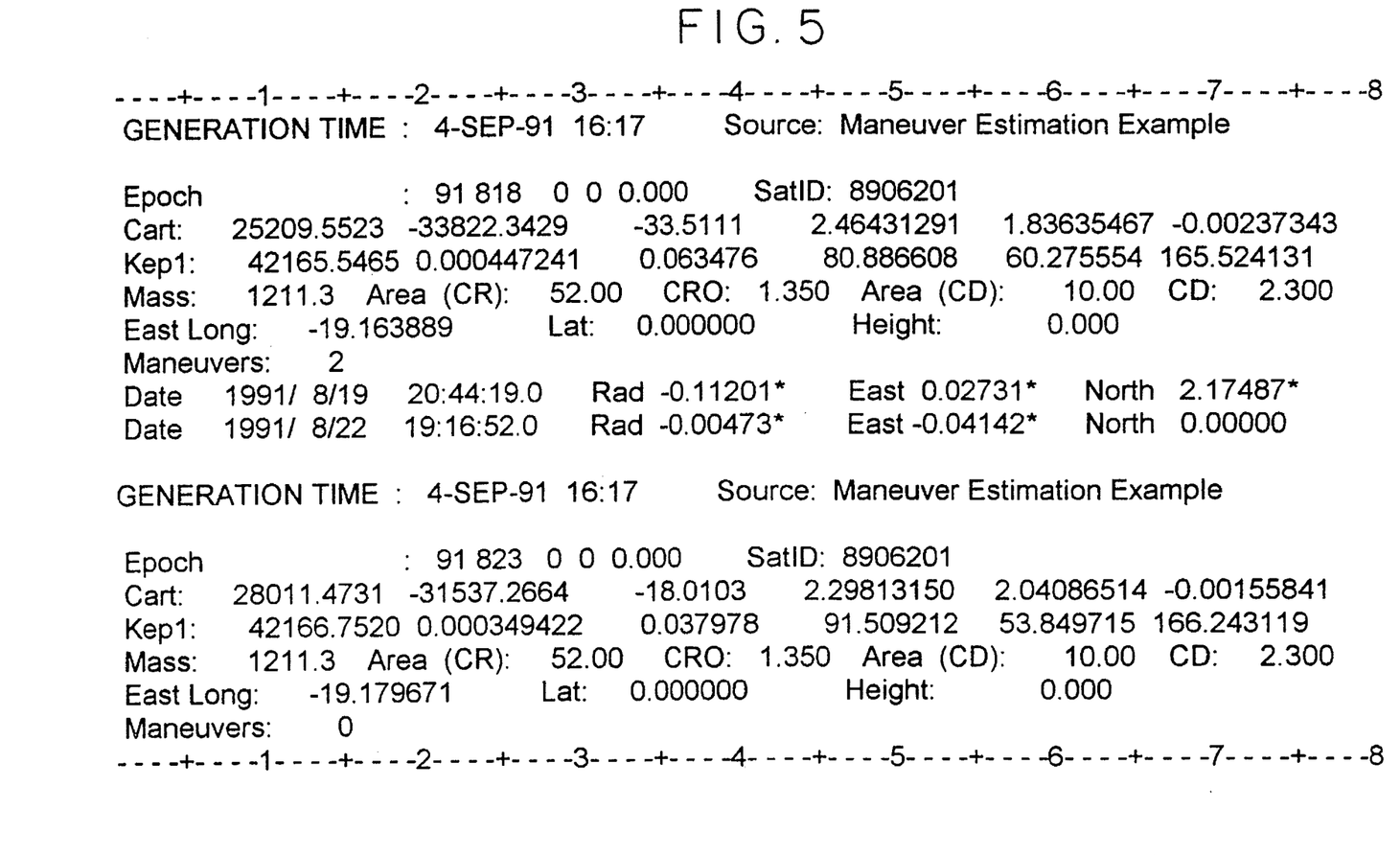
FIG. 5 shows a further section of an orbit database provided for definition of parameters and their arrangement.

A section of the orbit database 1 is set forth in FIG. 4, the appearance of a data record in a screen mask generated with "DECforms" (designation of a mask generating software of the company Digital Equipment) being shown, The orbit database 1 consists of a sequence of data records which serve essentially to store the following data on an orbit section limited in time, such as epoch or reference point in time;

state vector, orbit elements and satellite longitude at the epoch;

satellite parameters, such as area, mass, radiation pressure coefficient, and the like, and maneuvers, such as time and velocity increments, after the epoch, An example of such a sequence of data records in the orbit database 1 is shown in FIG. 5, which is a printout of data obtained in a practical test. In FIG. 5 the definition of the parameters and their arrangement in the ASCII format are given, two data records being shown, in the upper region with two estimated maneuvers (maneuvers: 2) and in the lower region without maneuvers (maneuvers:0).

To better meet the operational requirements, the orbit database 1 is divided into two databases which are referred to hereinafter as scratch database and best-knowledge database. The scratch database serves for example during a station keeping cycle for short-term storing of various orbit determination and maneuver planning results and keeping them available for comparison and analysis purposes. The best-knowledge database contains on the other hand an chronologically ordered sequence of data records which at any time set forth the best-knowledge status of the orbit profile, including all the maneuvers.

To create the best-knowledge database the data records of the scratch database are integrated into the best-knowledge database which, in the opinion of the user, correspond to the best orbit determination result or the actual maneuver planning or which are made available by external control centres for their satellites. In the transmission of new data records from tile scratch database to the best-knowledge database the user is assisted to a great extent by screen masks and additional software modules by which for example the data records are automatically chronologically sorted and obsolete data records or records which have become invalid are automatically removed from the best-knowledge database.

In this manner, it is possible at any time to derive from the best-knowledge database the optimum overview of the past and future orbit path of a satellite. By providing one such database for each of the participating satellites the relative geometry can be monitored without any gaps.

In addition, the orbit database and the scratch and best-knowledge databases permit simple access to all data required for carrying out an orbit determination or maneuver planning. This achieves very extensive disentanglement of the individual function blocks of an orbit control process. This results in an open system in which all data flows are clearly defined and restricted to a minimum.

Of particular importance within the framework of an orbit determination is an integrated maneuver estimation permitting a consistent treatment of relatively long orbit sections. Calibration is made possible automatically by transferring the components of the planned maneuver to a socalled summary sheet, which will be explained in detail below.

With unrestricted selection options for estimation or fixed predefinition of the individual maneuver components, correct execution of maneuvers can be checked within a few hours and not, as hitherto, in one or two days, and if necessary a quick reaction made to disturbances.

Figure 6:
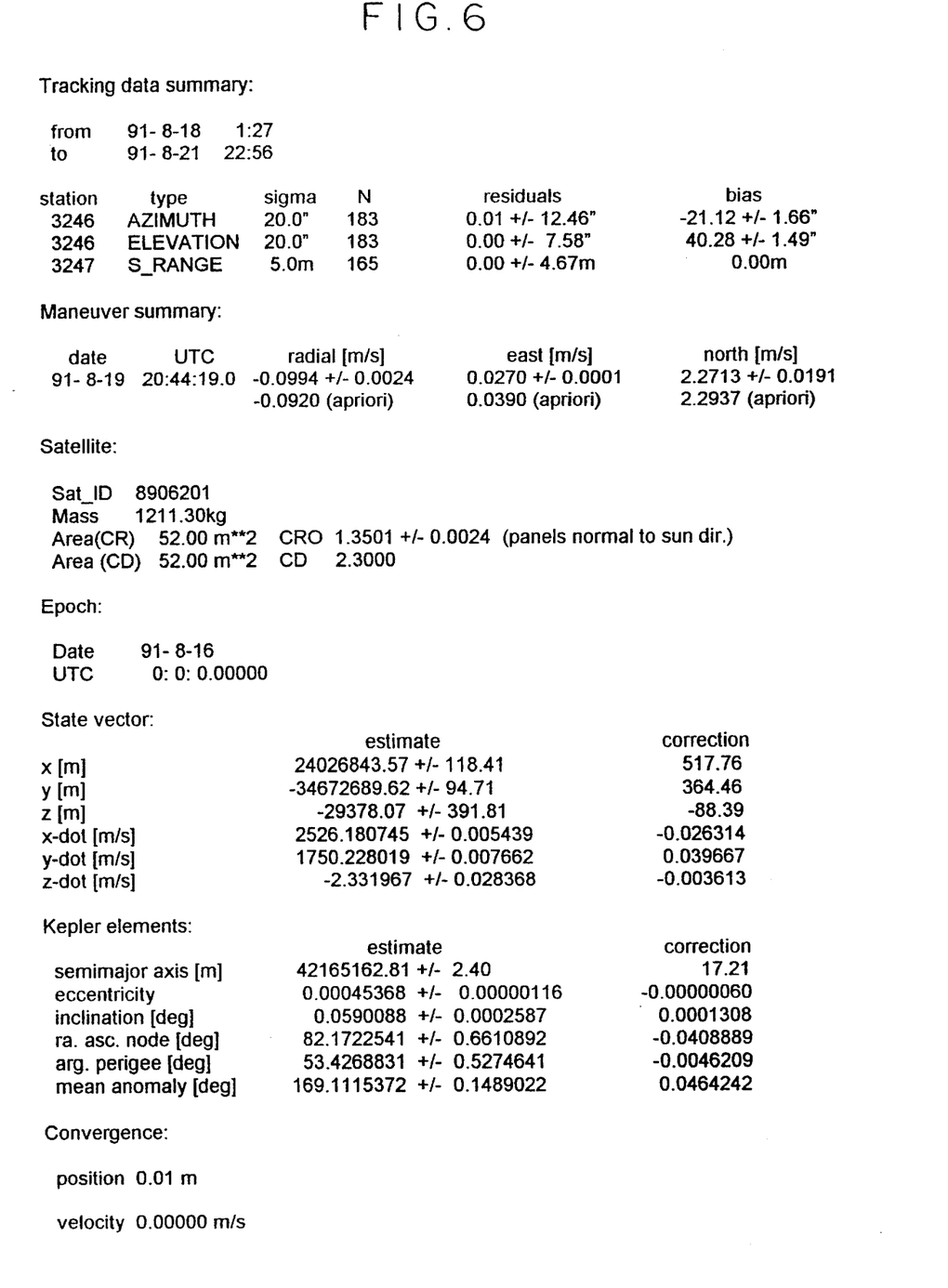
FIG. 6 shows an example of a summary sheet of the orbit determination and maneuver estimation with three estimated components of a north/south maneuver.
Figure 7:
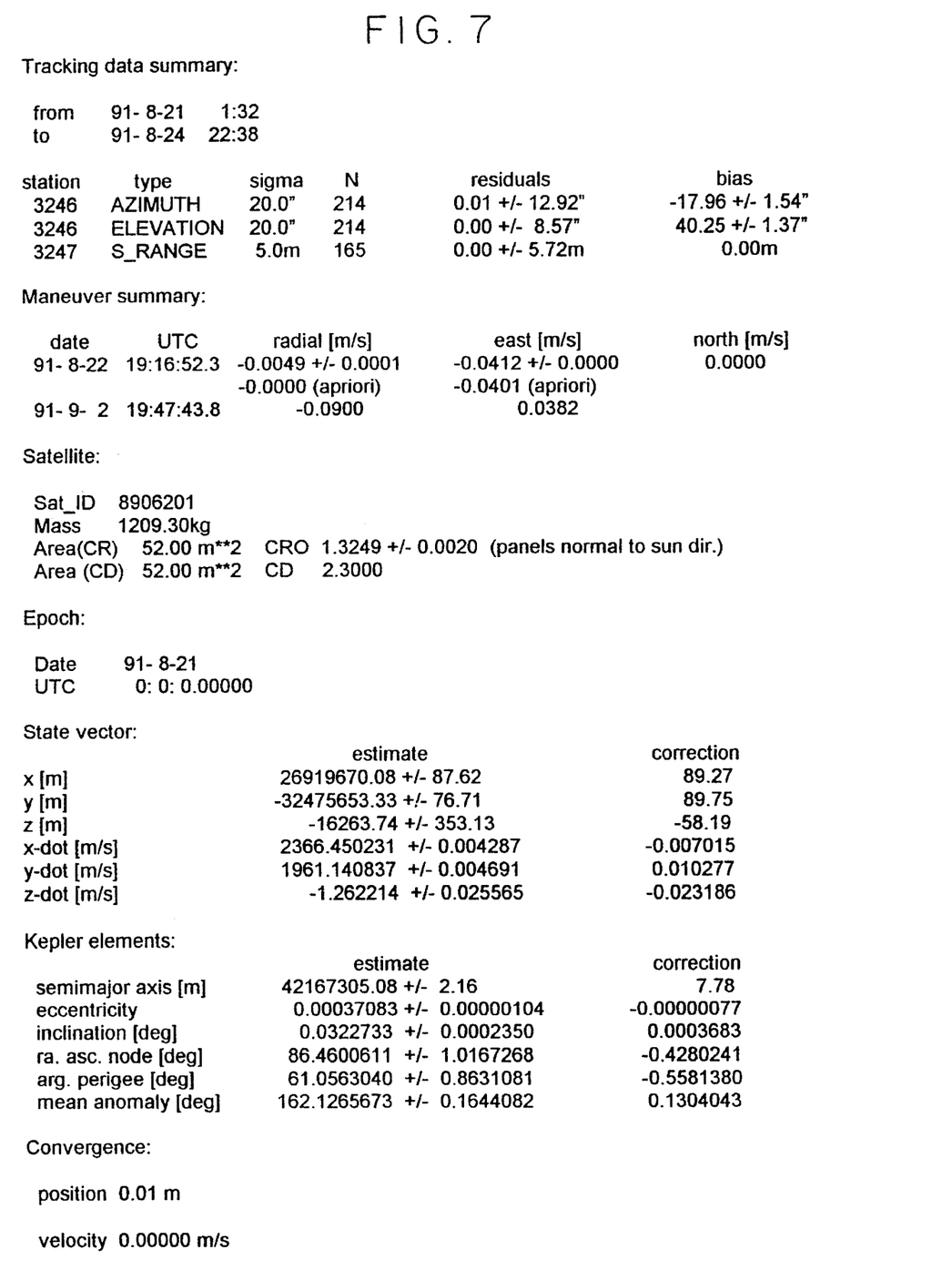
FIG. 7 shows an example of a further summary sheet of the orbit determination and maneuver estimation with two estimated and one predetermined component of an east/west maneuver and with three predetermined components of a north/south maneuver.

The efficiency of each of the four function blocks or core modules 2 to 5 is further enhanced by a particular compressed summary of the orbit determination results in written or graphic form. For quantitative assessment, tracking data arranged by types and their time period, maneuver times and maneuver components, as well as orbit elements and a state vector, are summarized in the already mentioned summary sheets as shown by way of example in FIGS. 6 and 7. In FIG. 6 the summary sheet of the orbit determination and maneuver estimation are shown and in the example selected three estimated components of a north/south maneuver are illustrated. In FIG. 7 a further summary sheet of the orbit determination and maneuver estimation is shown, and as an example two estimated and one predetermined component of an east/west maneuver and three predetermined components of a north/south maneuver are set forth. Since the summary sheets in FIGS. 6 and 7 are again a computer printout, the individual designations are in the English language in this case as well. The summary sheet, two examples of which are shown in FIGS. 6 and 7, presents in compact form information on the values of all the estimate parameters and their statistical uncertainty furnished by the core module 2.

Figure 8A:
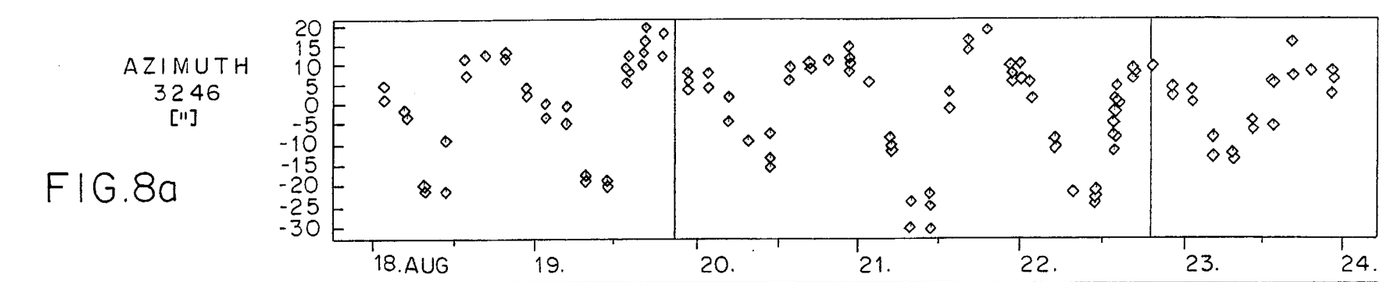
FIGS. 8a–8c show by way of example a representation of a residual plot for assessing orbit determination results.
Figure 8B:
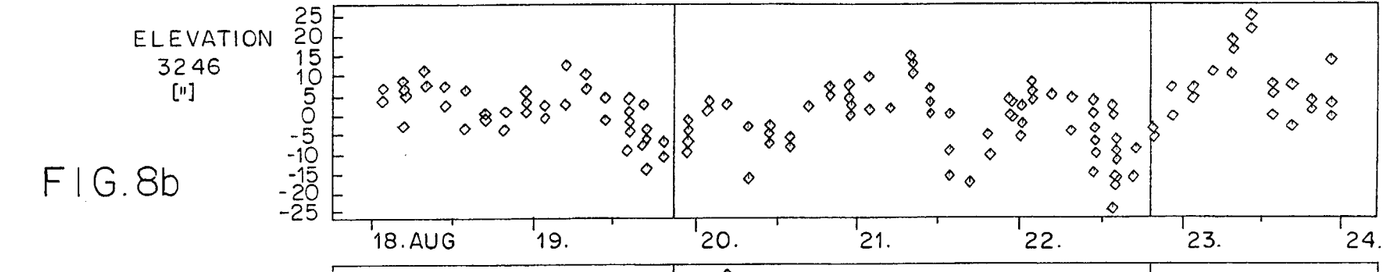
Figure 8C:
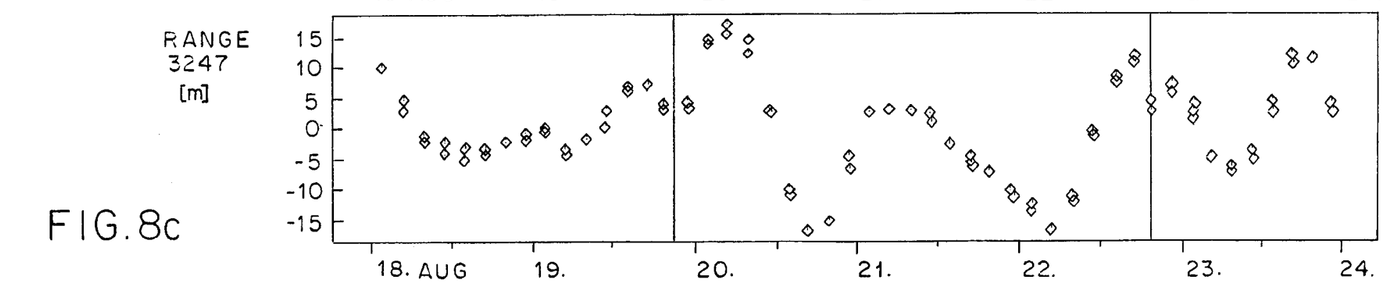

To assess the quality of various tracking data socalled residuals representing observed minus calculated measured values are graphically illustrated over a tracking interval. An example of such tracking data is a socalled residuals plot which is shown in FIGS. 8a–8c and which is used for assessing orbit determination results. In the residual plot of FIGS. 8a–8c the residuals of the angular values of the azimuth and elevation of the station 3246 and the range values of the station 3247 are shown. The vertical lines in the fields mark the times of two maneuvers carried out on Aug. 19 and Aug. 22, 1991.

Figure 9A:
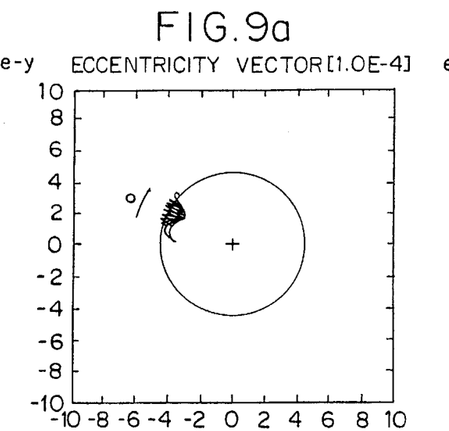
FIGS. 9a–9c shows a representation by way of example of a station keeping plot for a correction cycle.
Figure 9B:
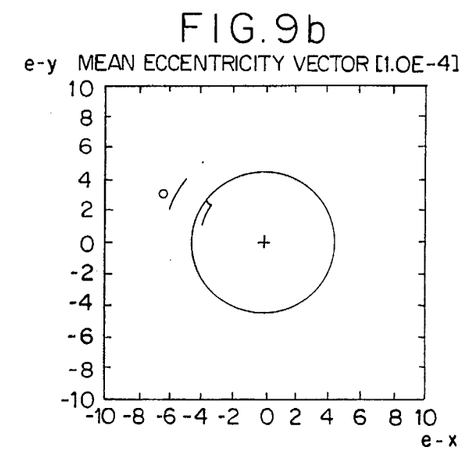
Figure 9C:
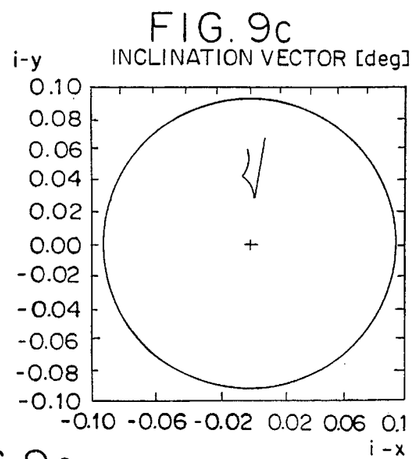
Figure 9D:
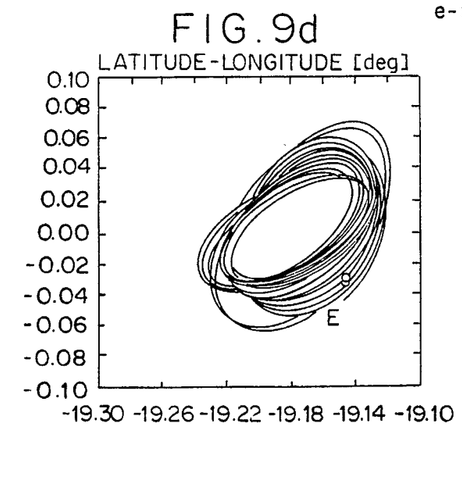
Figure 9E:
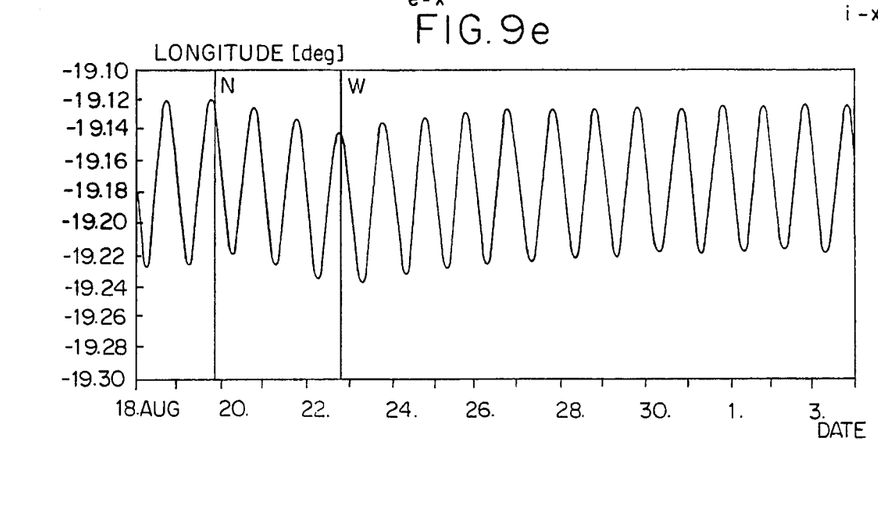
Figure 10A:
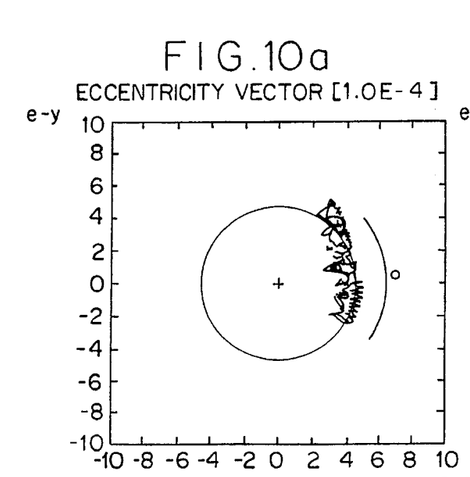
FIGS. 10a–10e shows a further example of a station keeping plot for advance planning of a series of correction cycles each with a north/south and then only one following east/west maneuver.
Figure 10B:
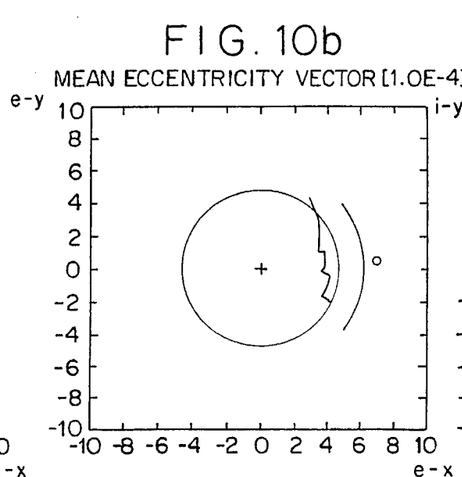
Figure 10C:
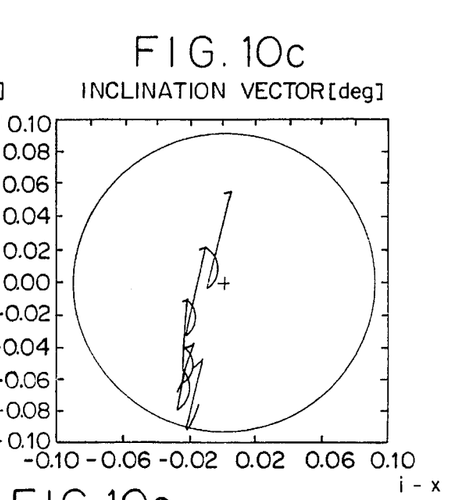
Figure 10D:
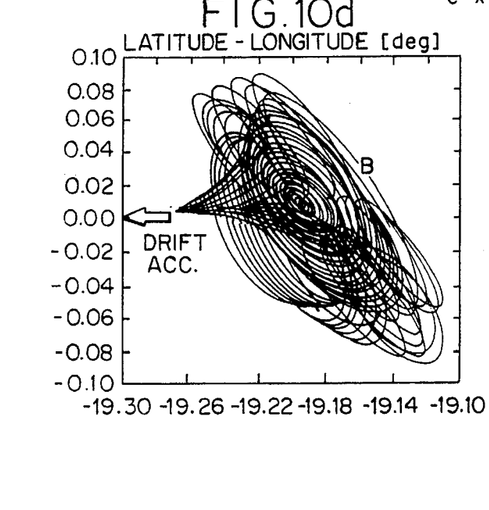
Figure 10E:
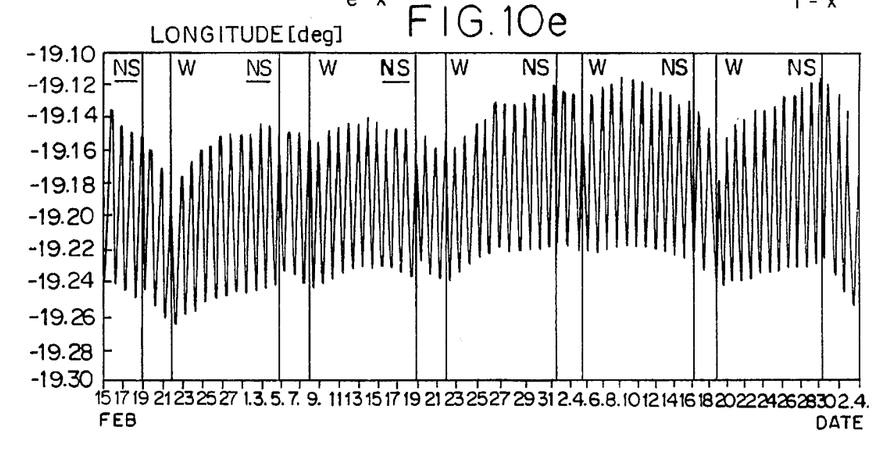

To assess the further orbit path, all data essential to the orbit control, for example an osculating and mean eccentricity vector, an inclination vector, a movement in longitude and latitude, etc., are summarized in a graphical representation. Such a graphical representation is shown in the form of a station keeping plot in FIGS. 9a–9c for a quite specific correction cycle.

The orbit information relevant for a further orbit control is also made available in the form of a database record which is linked directly to the scratch database (see FIG. 5). Such a database record contains the epoch orbit elements determined and the maneuvers included in a tracking data interval. Estimated maneuver components are marked with a star (*) which is absent in the case of predetermined components (cf. in this connection the upper data record in FIG. 5). In addition, at the request of the user a second data record is generated which is valid for a future epoch, as apparent from the lower data record in FIG. 5. This data record can for example be chosen in such a manner that it contains the point of time and initial orbit elementls of the next planned orbit determination.

Figure 2:
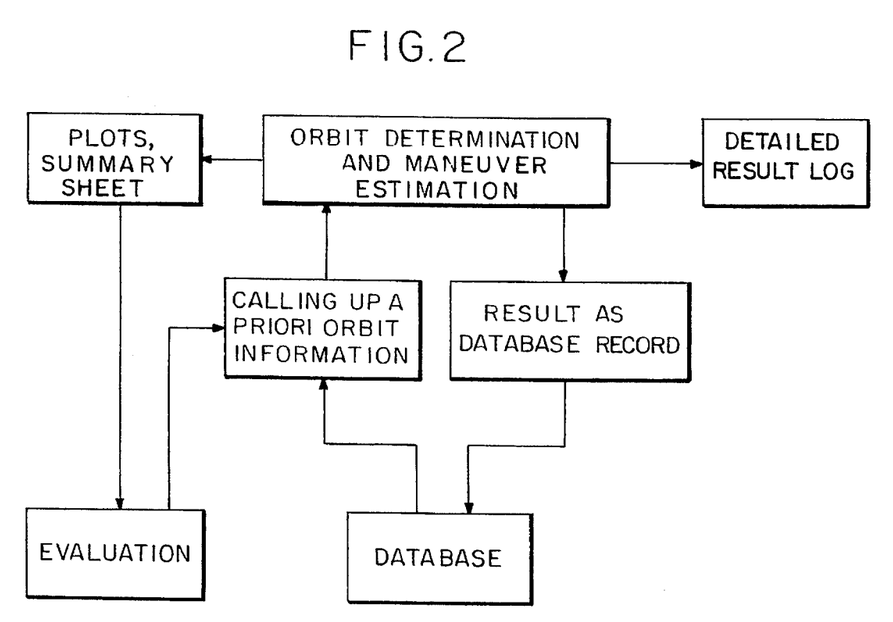
FIG. 2 is a block diagram showing working steps for performing an orbit determination and a maneuver calibration.

The working steps necessary for performing an orbit determination and a maneuver calibration are thereby reduced all together to the selection of a database record with the desired initial data, the specification of the tracking interval, the start of the orbit determination program and the evaluation of the results. An example of the necessary working steps to be carried out is shown by a working diagram in FIG. 2 which is given in block form and is self-explanatory.

The detailed result logs likewise furnished by the function block 2 or orbit determination module 2 have to be employed for the assessment only in an exceptional case. The structure shown schematically in FIG. 2 also represents the basis for a completely automatic orbit determination without any human intervention within the framework of an expert system. In such a case the evaluation can be made completely with the aid of the information made available in the summary sheet (see FIG. 6 and 7).

In a maneuver planning an orbit control is carried out in time cycles. At the end of each cycle certain target orbit elements are to be achieved which are normally prescribed by a station keeping strategy or can be alternatively defined by the user in a specific case. A cycle may contain several east/west and north/south maneuvers.

By means of the function block 5 or maneuver planning module 5 an orbit data item is fetched from the database and the future orbit is determined without recourse to the function block 2 or the orbit determination/prediction module. From a comparison with the target or desired orbit elements in unitary manner both east/west and south/north correction maneuvers may then be determined. By a maneuver computing procedure account is taken here of known coupling effects which are stored in the form of coefficients in a satellite-specific file and are updated by the user from time to time in accordance with the calibration results.

The desired orbit elements are determined by the station keeping strategy in such a manner that for all satellites on the one hand the tolerance window is maintained and on the other a maximum possible safety distance apart ensured. In the case of avoidance maneuvers which may become necessary or relocations, the user can define maneuver sequences and desired elements adapted to the situation.

The results of the maneuver planning are illustrated graphically in the specifically configured socalled station keeping plot already mentioned with the orbit prediction; an example of such a station keeping plot for a correction cycle is shown in FIGS. 9a–9e. The selection of the parameters, their representation in subdiagrams, their automatic scaling and their arrangement as shown in FIGS. 9a–9e are tailored specifically to the needs of the verification of the station keeping maneuver strategy and keeping the satellite in a tolerance window. All the parameters essential to the station keeping of the individual satellite are clearly shown for example on the station keeping plot of FIGS. 9a–9e taking up one page.

Figure 3:
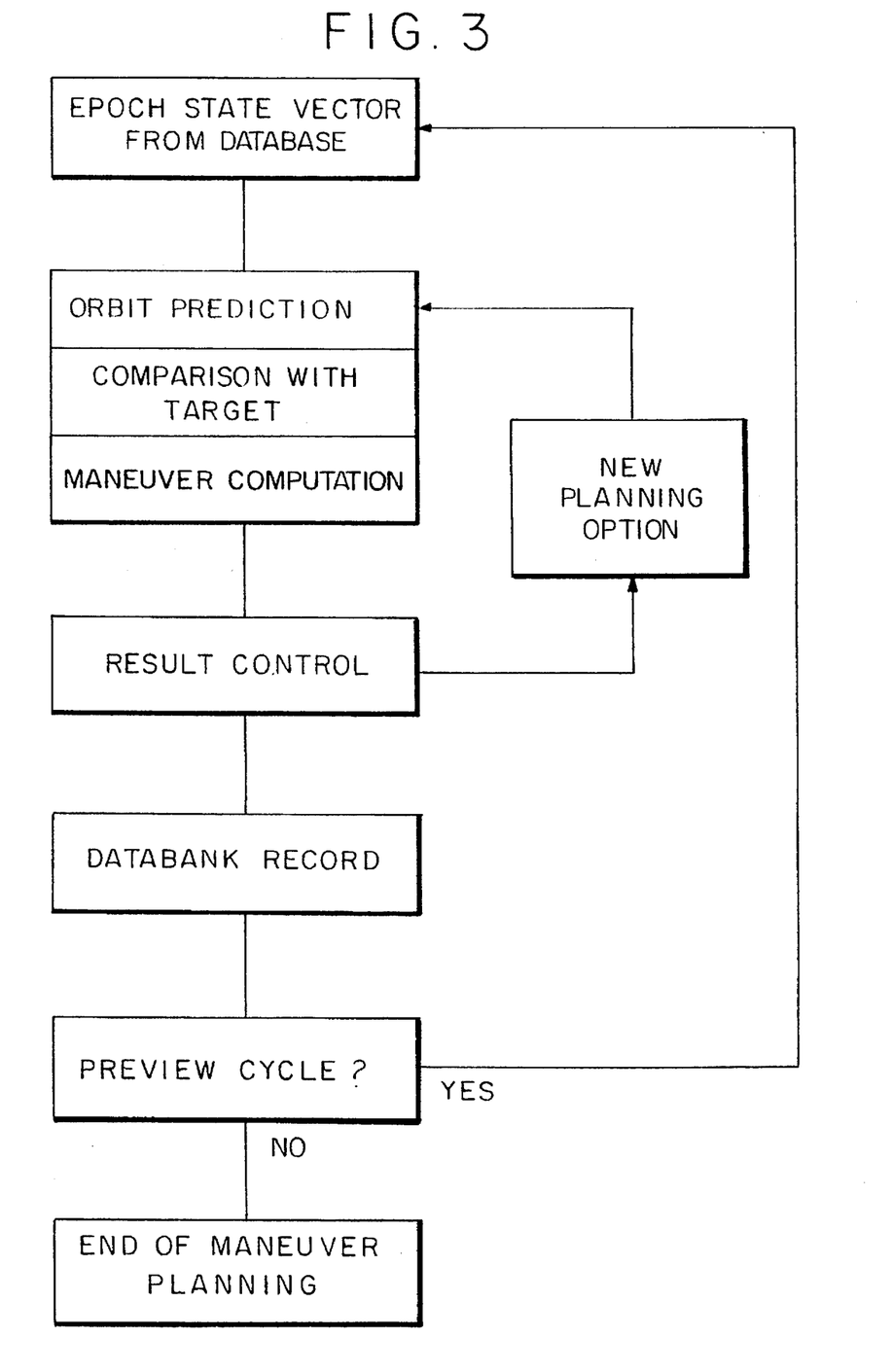
FIG. 3 shows an example of a sequence diagram of a maneuver planning.

Using the option of being able to plan in advance and represent several correction cycles, undesired coupling effects, for example maneuver components directed towards the earth's centre, can be employed for eccentricity control and in this manner with an acceptable additional planning expenditure east/west maneuvers may be saved, as readily apparent for example from the schematic sequence diagram illustrated in FIG. 3.

FIG. 10 illustrates the result of such preplanning for six correction cycles in a period of 78 days. The preplanning shown in FIGS. 10a–10e illustrates a series of correction cycles each with one north/south maneuver and only one east/west maneuver instead of two such consecutive maneuvers as is usual. The respective second east/west maneuver for the e-vector control can be saved in that the radial coupling components of the north/south maneuvers are utilized. It is apparent from the station keeping plot of FIGS. 10a–10e that the satellite remains in the prescribed tolerance window, the e and i-vectors keeping the strategy specifications within tolerable limits.

Finally, a further essential part of the orbit control system is the determination of the relative geometry of the orbit movement of neighbouring satellites. The neighbouring satellites here may be permanently co-located or only temporarily adjacent satellites, for example in relocation or phasing-in new satellites and phasing-out satellites being taken out of service. The monitoring of the relative geometry was made difficult hitherto by the lack of any possibility of a common administration of orbit and maneuver data. Such a monitoring can however now be implemented with the aid of the best-knowledge databases for several satellites without any appreciable difficulties. The former necessity of describing the long-term orbit profile by an individual state vector and a subsequent series of maneuvers is obviated. Instead, at any point in time the best orbit information is available and consequently the relative movement can be predicted and executed with the greatest possible certainty. There are no restrictions regarding the time distribution of the state vector data for the individual satellites.

The user interface of the function block 4 for monitoring the relative movement permits an import of external orbit data, the conversion thereof to the internal format of the orbit database 1 and also an export of orbit data to external control stations in a matched format. An integrated plot of the e and i vector of all participating satellites makes it possible to monitor observance of the separation strategy by the individual satellites.

Figure 11A:
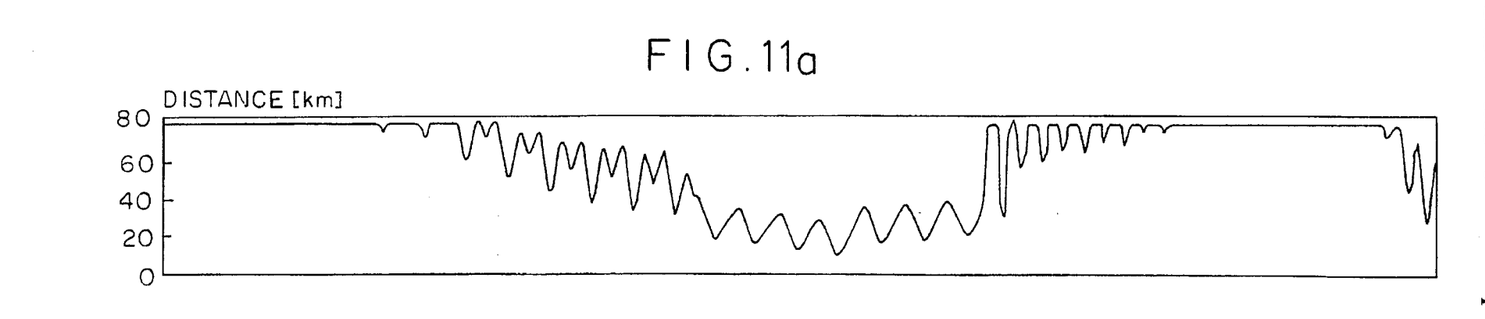
FIGS. 11a–11e shows an example illustrating a socalled proximity plot for two satellites.
Figure 11B:
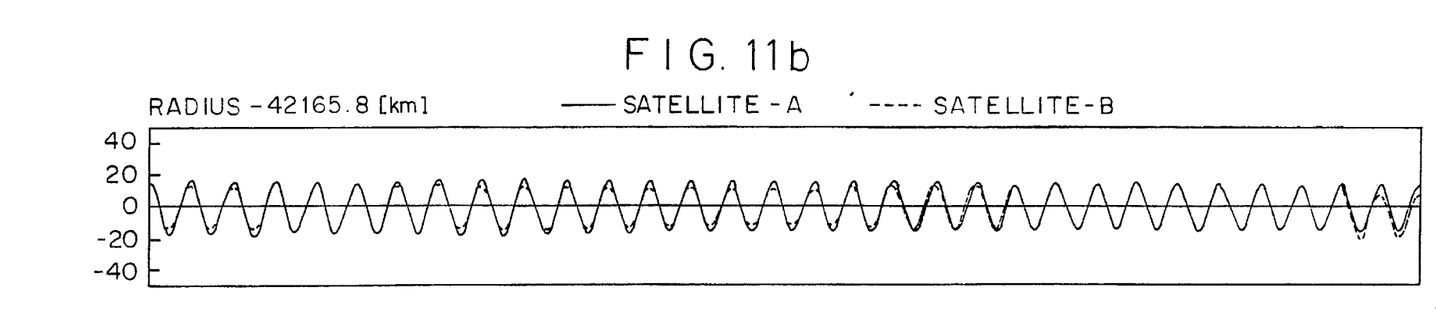
Figure 11C:
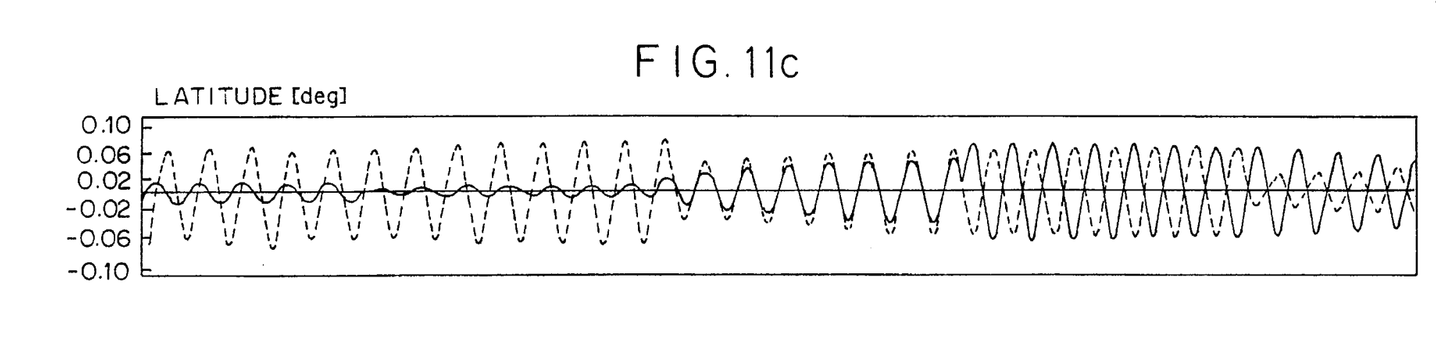
Figure 11D:
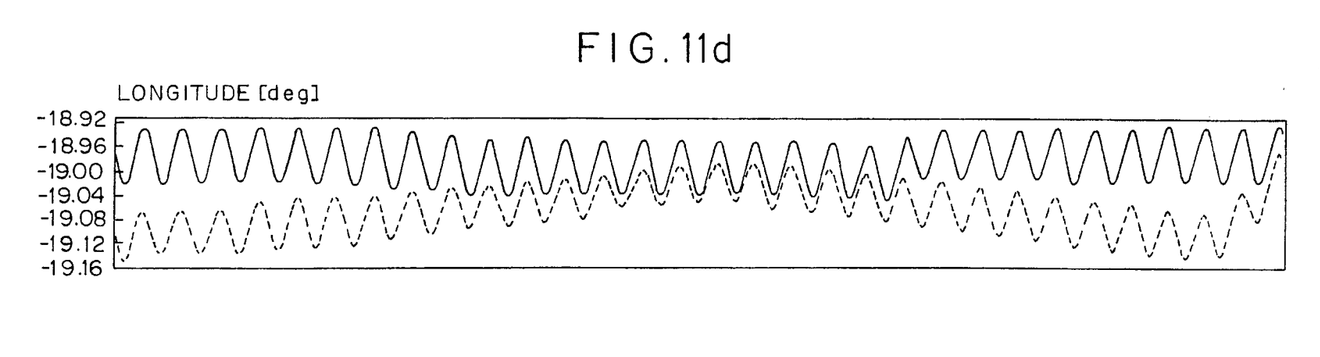
Figure 11E:
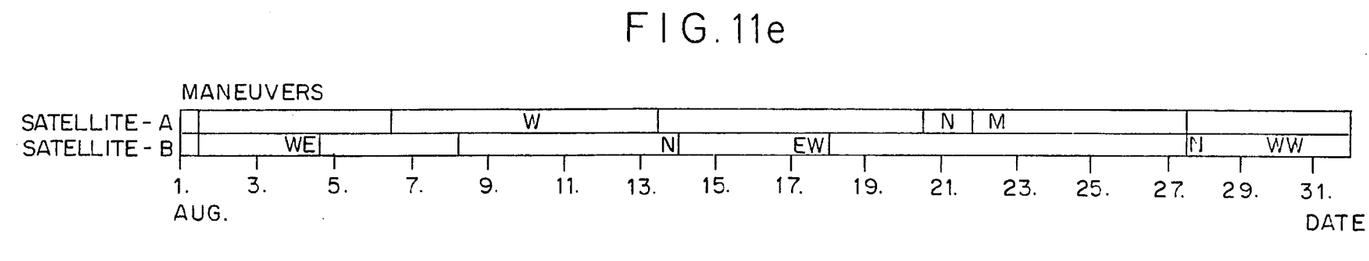

The possible future occurrence of close encounters is checked by the apparatus according to the invention in pairs for all the participating satellites and if safety distances are infringed a respective further plot is generated for a further risk assessment. In such a plot, an example of which is given in FIGS. 11a–11e, apart from the total relative distance the composition thereof is illustrated from three spatial directions and in FIG. 11e the points in time and direction of the past and planned maneuvers of the two satellites are set forth. In addition, by vertical lines in FIG. 11e the points in time are marked from whence a new orbit element database record is available for the satellites A and B. For planning evasion maneuvers the function block 3 or the maneuver planning module 3 is employed, the function scope of which affords the necessary options.

This procedure is extended if necessary to the monitoring of other events which result from the relative movement and the closeness of several satellites. Such events may for example be interference signals in infrared earth sensors or shadows of the communications sections between a satellite and a ground station.

As already explained in conjunction with FIG. 1, the function block 5 serves to predict special events and epheremides. Such special events include passages of a satellite through shadow zones of earth and moon, traversing of the sun through the receiving lobe of the ground antenna directed towards the satellite and the usually disturbing passages of the earth and moon through the fields of view of the infrared earth sensors of the satellites used for the position control.

For this purpose known computation methods are employed. The calling up and execution of the orbit prediction using the best-knowledge database including all known maneuvers at the point in time in question is made possible only with the apparatus according to the invention in that the function block 5 for predicting special events is assigned to the database. By the provision and assignment of the function block 5 the reconstruction of an orbit is also possible, including all past maneuvers from the best-knowledge database for subsequent analysis and general documentation purposes. It is only with the apparatus according to the invention that this type of interface for connecting programs of the user is provided and possible, for example for computing time regions in which interference effects due to the sun and moon on the infrared sensors can occur or for example for preparing the return to the normal position of the satellite after loss of position.

Consequently, the following points represent the essential advantages of the apparatus according to the invention for orbit control of co-located geostationary satellites:

a disentanglement of the individual objective parts and the data flows;

a minimizing of the user interfaces;

increasing the precision by
an integrated orbit determination and a maneuver estimation, optionally an estimation or pre scribing of each component of a maneuver, an improved maneuver calculation and taking account of the systematic coupling effects in a maneuver planning;

a specific configuration for co-located satellites;

a reduction of the archiving expenditure;

an increase in the operation reliability and a reduction of the operational expenditure.

We claim:

1. An apparatus for orbit control of at least two co-located geostationary satellites, comprising:

means for consecutively calling up a plurality of function blocks of an orbit control system with a matched function scope in an indicated order via an orbit database which serves as interface between said plurality of function blocks and to which data is transferred in a defined format such that said plurality of function blocks obtain the required input data from the orbit database and if necessary supply results which are generated back to said orbit database;

a) first function block means of said plurality of function blocks for obtaining orbit determination data based on the measurements of ground stations, said first function block means determines all parameters which are necessary for calculation of ephemerides in the form of lists containing position, velocity and other important orbit-relevant quantities in discrete time steps, as functions of the time or a desired time period, and calibration data of executed orbit maneuvers for co-located satellites and stores them in an orbit database;

b) second function block means of said plurality of function blocks for maneuver planning, said second function block means accesses the results stored in said orbit database and calculates therefrom, parameters for orbit maneuvers so that a satellite at predetermined dates reaches a fixed desired orbit, again said parameters for orbit maneuvers are also stored in said orbit database;

c) third function block means of said plurality of function blocks for monitoring and calculating, with the aid of said parameters for orbit maneuvers stored in said orbit database, relative movement of all co-located satellites and calculates the relative distances and velocities, resolved by components, between said co-located satellites for a desired period of time, said relative distances and velocities are also stored in said database, and d) fourth function block means of said plurality of function blocks, using information stored in said orbit database form said first, second and third function blocks for predicting specific events and ephemerides, and computes a detailed orbit ephemeris.

2. An apparatus according to claim 1, further comprising unit means for representing events in compact reproduction in the form of diagrams, short tables or database entries which contain all the essential data in clear form, but only said data.

3. An apparatus according to claim 1, wherein said orbit database consists of a scratch database and a best-knowledge database, said scratch database contains all current orbit database records of said first and second function block means for orbit determination and maneuver planning and after a check by an user, .said scratch database reads out again and permanently enters said current orbit database records into the best-knowledge database, the two databases entries are interactively selected and read out from which a new input file for said first and second function blocks means for orbit determination and maneuver planning is configured, while said third and fourth function blocks means for monitoring the relative movement and for predicting special events fetch their input data form the best-knowledge database.

4. An apparatus according to claim 1, wherein for each co-located or temporary adjacent satellite an own best-knowledge database is created.

5. An apparatus according to claim 1, comprising user interface means in the form of an interface between user and software for an import of external orbit data and for an export of own orbit data in a previously fixed format matched between participating control centers.

6. An apparatus according to claim 1, comprising unit means for determining a relative geometry in the orbit movement of co-located or temporary adjacent satellites in the form of relative locations between the satellites which are each related to any selected satellite.

7. An apparatus according to claim 1, further comprising user interference means monitoring the maintenance of the separation strategy, in which desired orbits to which individual satellites are controlled at regular intervals of time are so selected that on the one hand a tolerance window is maintained by said individual satellites but on the other hand the nominal mutual distances apart never drops below a lower limit, and provides an integrated plot an eccentricity vector and an inclination vector of all participating satellites, wherein the eccentricity of an ellipse in an orbit plane which is inclined at an angle to the equatorial plane is defined.

8. The apparatus according to claim 1, wherein the specific events and ephemerides includes selectively passage of a satellite through an earth or moon shadow, a disturbance of an infrared transmitter by entrance of the sun or moon into a field of view of the transmitter, and a position of the sun near a line of sight of the ground station to the satellite.

9. A system for controlling orbits of satellites of a geostationary satellite cluster, comprising:

processing means for calculating in discrete function blocks;

a memory containing a single ephemeris database;

means for providing satellite ground station data; means for calculating from the ground station data and from already-executed maneuvers, in an orbit-determination calculation of a first function block, ephemeride parameters for each satellite of the cluster at arbitrary times;

means for storing the ephemeride parameters in the database;

means for calculating from the ephemeride parameters, in a maneuver-planning calculation of a second function block, corrective orbit maneuvers for each satellite of the cluster;

means for storing the orbit maneuvers in the database;

means for predicting from the orbit maneuvers, in a relative-movement calculation of a third function block, relative motions of the satellites of the cluster;

means for storing the relative motions in the database and means for predicting from the parameters, the orbit maneuvers, and the relative motions, in an event prediction calculation of a fourth function block, ephemerides of the satellites.

10. The system according to claim 9, further including means for representing events in compact form selectively as diagrams, tables, and database entries.

11. The system according to claim 9, wherein the single ephemeris database is a best-knowledge database and the system further comprises:

a scratch database for storing current orbit database records generated by the means for calculating from the ground station data and from already-executed maneuvers of a first function block and by the means for calculating from the ephemeride parameters of a second function block;

means for transferring the current orbit database records to the best-knowledge database for permanent storage; and means for interactively selecting from the scratch database and the best-knowledge database to generate a new input file.

12. The system according to claim 11, including a respective best-knowledge database for each satellite.

13. The system according to claim 9, including a software-user interface for sending and receiving orbit data in a fixed format, whereby various participating control centers may employ the interface.

14. The system according to claim 9, wherein the means for predicting relative motions of the satellites of the cluster further comprises unit means for determining relative geometry of the cluster relative to any selected one satellite.

15. The system according to claim 9, further comprising user interference means for monitoring the maintenance of the separation strategy, in which desired orbits to which individual satellites are controlled at regular intervals of time are so elected that a tolerance window is maintained by said individual satellites but the nominal mutual distances apart never drop below a lower limit, and for providing an integrated plot for each participating satellite of a respective eccentricity vector and a respective inclination vector, the eccentricity vector being defined within an orbit plane inclined at an angle to the equatorial plane.

16. A process for controlling orbits of satellites of a geostationary satellite cluster, comprising the steps of:

providing processing means for calculating in discrete function blocks;

providing a memory containing a single ephemeris database;

providing satellite ground station data;

providing means for calculating from the ground station data and from already-executed maneuvers, in an orbit-determination calculation of a first function block, ephemeride parameters for each satellite of the cluster at arbitrary times;

storing the ephemeride parameters in the database;

providing means for calculating from the ephemeride parameters, in a maneuver-planning calculation of a second function block, corrective orbit maneuvers for each satellite of the cluster;

storing the orbit maneuvers in the database;

providing means for predicting from the orbit maneuvers, in a relative-movement calculation of a third function block, relative motions of the satellites of the cluster;

storing the relative motions in the database; and providing means for predicting from the parameters, the orbit maneuvers, and the relative motions, in an event prediction calculation of a fourth function block, ephemerides of the satellites.

17. The process according to claim 16, further including a step of providing means for representing events in compact form selectively as diagrams, tables, and database entries.

18. The process according to claim 16, wherein the single ephemeris database is a best-knowledge database and the process further comprises a step of:

providing a scratch database for storing current orbit database records generated by the means for calculating from the ground station data and from already-executed maneuvers of a first function block and by the means for calculating from the ephemeride parameters of a second function block;

providing means for transferring the current orbit database records to the beet-knowledge database for permanent storage; and providing means for interactively selecting from the scratch database and the best-knowledge database to generate a new input file.

19. The process according to claim 18, including a step of providing a respective best-knowledge database for each satellite.

20. The process according to claim 16, including a step of providing a software-user interface for sending and receiving orbit data in a fixed format, whereby various participating control centers may employ the interface.

21. The process according to claim 16, further comprising a step of providing user interference means for monitoring the maintenance of the separation strategy, in which desired orbits to which individual satellites are controlled at regular intervals of time are so elected that a tolerance window is maintained by said individual satellites but the nominal mutual distances apart never drop below a lower limit, and for providing an integrated plot for each participating satellite of a respective eccentricity vector and a respective inclination vector, the eccentricity vector being defined within an orbit plane inclined at an angle to the equatorial plane.

* * * * *